United States Patent
Shoemaker et al.

(10) Patent No.: US 12,445,376 B2
(45) Date of Patent: Oct. 14, 2025

(54) APPLICATION PATH SELECTION FOR CLOUD-BASED APPLICATIONS FROM A CLIENT DEVICE

(71) Applicant: Cisco Technology, Inc., San Jose, CA (US)

(72) Inventors: Ryan William Shoemaker, Naperville, IL (US); Shikha Jain, Fremont, CA (US); Meghana Mukund Amble, San Jose, CA (US); Jay Ponce, Wylie, TX (US); Santosh Ramrao Patil, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/936,534

(22) Filed: Sep. 29, 2022

(65) Prior Publication Data
US 2024/0113967 A1 Apr. 4, 2024

(51) Int. Cl.
*H04L 45/00* (2022.01)
*H04L 9/40* (2022.01)
*H04L 43/08* (2022.01)
*H04L 67/50* (2022.01)

(52) U.S. Cl.
CPC .............. *H04L 45/70* (2013.01); *H04L 43/08* (2013.01); *H04L 63/1408* (2013.01); *H04L 67/535* (2022.05)

(58) Field of Classification Search
CPC ..... H04L 45/70; H04L 43/08; H04L 63/1408; H04L 67/535
See application file for complete search history.

(56) References Cited

U.S. PATENT DOCUMENTS

| | | | |
|---|---|---|---|
| 8,270,310 B2* | 9/2012 | Raleigh | H04L 41/0806 709/224 |
| 8,493,947 B2* | 7/2013 | Lee | H04W 48/20 370/341 |
| 9,887,936 B2* | 2/2018 | Maino | H04L 47/24 |
| 10,320,655 B1* | 6/2019 | Asveren | H04L 45/306 |
| 2003/0204594 A1* | 10/2003 | Kakadia | H04L 9/40 714/E11.197 |
| 2006/0039335 A1* | 2/2006 | Ono | H04W 92/02 370/335 |
| 2013/0265940 A1* | 10/2013 | Su | H04L 67/63 370/328 |
| 2014/0215081 A1* | 7/2014 | Cili | H04W 76/18 709/227 |
| 2017/0041246 A1* | 2/2017 | Maino | H04L 47/825 |

(Continued)

*Primary Examiner* — Ramy M Osman
(74) *Attorney, Agent, or Firm* — Baker Botts L.L.P.

(57) ABSTRACT

A system and method for improved application path selection for cloud-based applications from a client device. In one embodiment, a method includes collecting metrics of a remote user's use of one or more cloud-based applications, categorizing the one or more cloud-based applications based at least in part on the collected metrics, determining one or more secure network paths based at least in part on the categorizing of the one or more cloud-based applications, establishing the one or more secure network paths between the remote user and one or more network points-of-presence, and routing data traffic for the one or more cloud-based applications through the one or more established secure network paths.

17 Claims, 4 Drawing Sheets

(56) References Cited

U.S. PATENT DOCUMENTS

| | | |
|---|---|---|
| 2017/0214626 A1* | 7/2017 | Dunlap ............... H04L 47/2475 |
| 2018/0020315 A1* | 1/2018 | Guo ..................... H04L 63/083 |
| 2018/0026876 A1* | 1/2018 | Steindl .................... H04L 69/22 |
| | | 370/392 |
| 2018/0241727 A1 | 8/2018 | Verzun et al. |
| 2018/0255074 A1 | 9/2018 | Li et al. |
| 2019/0007270 A1* | 1/2019 | Suragi Math ........... H04L 47/24 |
| 2019/0239153 A1* | 8/2019 | Wu ................... H04W 72/0453 |
| 2019/0245892 A1* | 8/2019 | Chen ....................... H04L 63/20 |
| 2020/0059426 A1 | 2/2020 | Raleigh et al. |
| 2020/0220808 A1 | 7/2020 | Yuan |
| 2021/0067415 A1* | 3/2021 | De Vivero .............. H04L 67/12 |
| 2021/0234778 A1* | 7/2021 | Bendigeri ............... H04L 69/14 |
| 2021/0250376 A1 | 8/2021 | Hulick, Jr. |
| 2023/0012609 A1* | 1/2023 | Wang ..................... H04L 43/10 |
| 2023/0231802 A1* | 7/2023 | Vysotsky ............. H04L 67/025 |
| | | 709/224 |
| 2023/0333896 A1* | 10/2023 | Zuo ....................... G06F 9/5027 |
| 2024/0113967 A1* | 4/2024 | Shoemaker ......... H04L 63/1408 |

* cited by examiner

APPLICATION PATH SELECTION FOR CLOUD-BASED APPLICATIONS FROM A CLIENT DEVICE

TECHNICAL FIELD

The present disclosure relates generally to a field of cloud-based computer networks and, more particularly, to improved application path selection for cloud-based applications from a client device.

BACKGROUND

Users are more commonly accessing cloud-based applications from outside of an enterprise network. To provide secure network paths between the user device and the cloud server in which a cloud-based application is located, a network may select a path through a particular network element, such as a network point-of-presence, to route data between the user device and the cloud server. However, conventional approaches for such path selection can lead to the use of network paths that lower the performance of cloud-based applications.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Conventional approaches by network operators to select paths for transferring data between a remote user device and one or more cloud servers on which one or more cloud-based applications are hosted lead to inefficient routing, which reduces performance of the cloud-based applications. Certain embodiments as described herein improve on these conventional approaches by determining one or more secure network paths between the remote user's device and one or more cloud servers through particular network elements, such that data traffic associated with a particular cloud-based application is routed through the determined one or more secure network paths.

According to an embodiment, a method includes collecting metrics of a remote user's use of one or more cloud-based applications, categorizing the one or more cloud-based applications based at least in part on the collected metrics, determining one or more secure network paths based at least in part on the categorizing of the one or more cloud-based applications, establishing the one or more secure network paths between the remote user and one or more network points-of-presence, and routing data traffic for the one or more cloud-based applications through the one or more established secure network paths.

In certain embodiments, the method further includes updating the categories of the one or more cloud-based applications on a periodic basis based at least in part on collection of metrics of the remote user's use of one or more cloud-based applications, and determining the one or more secure network paths based at least in part on the updated categories. In some embodiments, the method further includes monitoring performance of the one or more cloud-based applications at one or more network points-of-presence; determining, on a per-application-basis, a performance score for the one or more network points-of-presence based on the monitored performance; and determining one or more secure network paths based at least in part on the performance score. In some embodiments, the method further includes gathering proximity information pertaining to a distance between the remote user and one or more network points-of-presence, and determining one or more secure network paths based at least in part on the proximity information. In some embodiments, the method further includes determining an upper limit of a number of secure network paths that can be established for the remote user, and determining the one or more secure network paths based at least in part on the determined upper limit of secure network paths.

In some embodiments, the method further includes collecting information associated with at least one of a frequency of use, duration of use, and data usage of the one or more cloud-based applications. In some embodiments, the method further includes routing application traffic through a particular network point-of-presence.

According to another embodiment, a system includes one or more processors and one or more computer-readable non-transitory storage media. The one or more computer-readable non-transitory storage media include instructions that, when executed by the one or more processors, cause the system to perform operations including collecting metrics of a remote user's use of one or more cloud-based applications, categorizing the one or more cloud-based applications based at least in part on the collected metrics, determining one or more secure network paths based at least in part on the categorizing of the one or more cloud-based applications, establishing the one or more secure network paths between the remote user and one or more network points-of-presence, and routing data traffic for the one or more cloud-based applications through the one or more established secure network paths.

According to yet another embodiment, one or more computer-readable non-transitory storage media embody instructions that, when executed by a processor, cause the processor to perform operations including collecting metrics of a remote user's use of one or more cloud-based applications, categorizing the one or more cloud-based applications based at least in part on the collected metrics, determining one or more secure network paths based at least in part on the categorizing of the one or more cloud-based applications, establishing the one or more secure network paths between the remote user and one or more network points-of-presence, and routing data traffic for the one or more cloud-based applications through the one or more established secure network paths.

Technical advantages of certain embodiments of this disclosure may include one or more of the following. A technical advantage of one embodiment may allow for improved performance of a cloud-based application at a user device by routing data traffic associated with the cloud-based application through a secure network path that offers improved performance characteristics when compared to other secure network paths. Certain embodiments allow for continual determination of secure network paths for transmitting data traffic associated with one or more cloud-based applications, such that data traffic may be dynamically steered to a particular secure network path should a currently-used secure network path degrade in performance. Some embodiments may allow for the data traffic of certain cloud-based applications to be prioritized over the data traffic of other cloud-based applications based at least on usage patterns of the prioritized cloud-based applications. Another technical advantage of certain embodiments of this disclosure is that data traffic flowing through a computer network may be more evenly distributed amongst the computer network's nodes, thereby balancing load within the computer network. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 1:
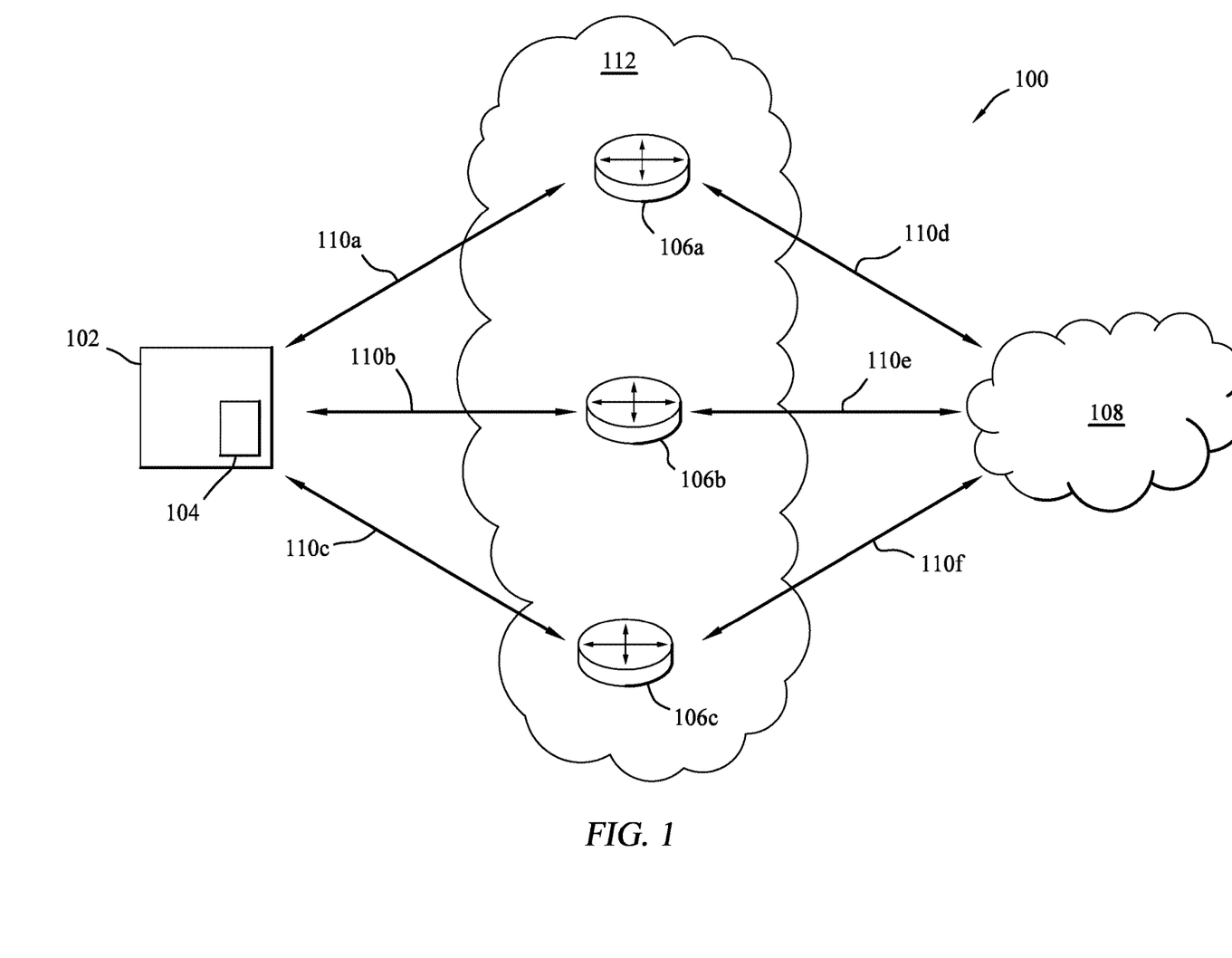
FIG. 1 illustrates an example computer network that provides improved application path selection for cloud-based applications from a client device, according to some embodiments of the present disclosure.
Figure 2:
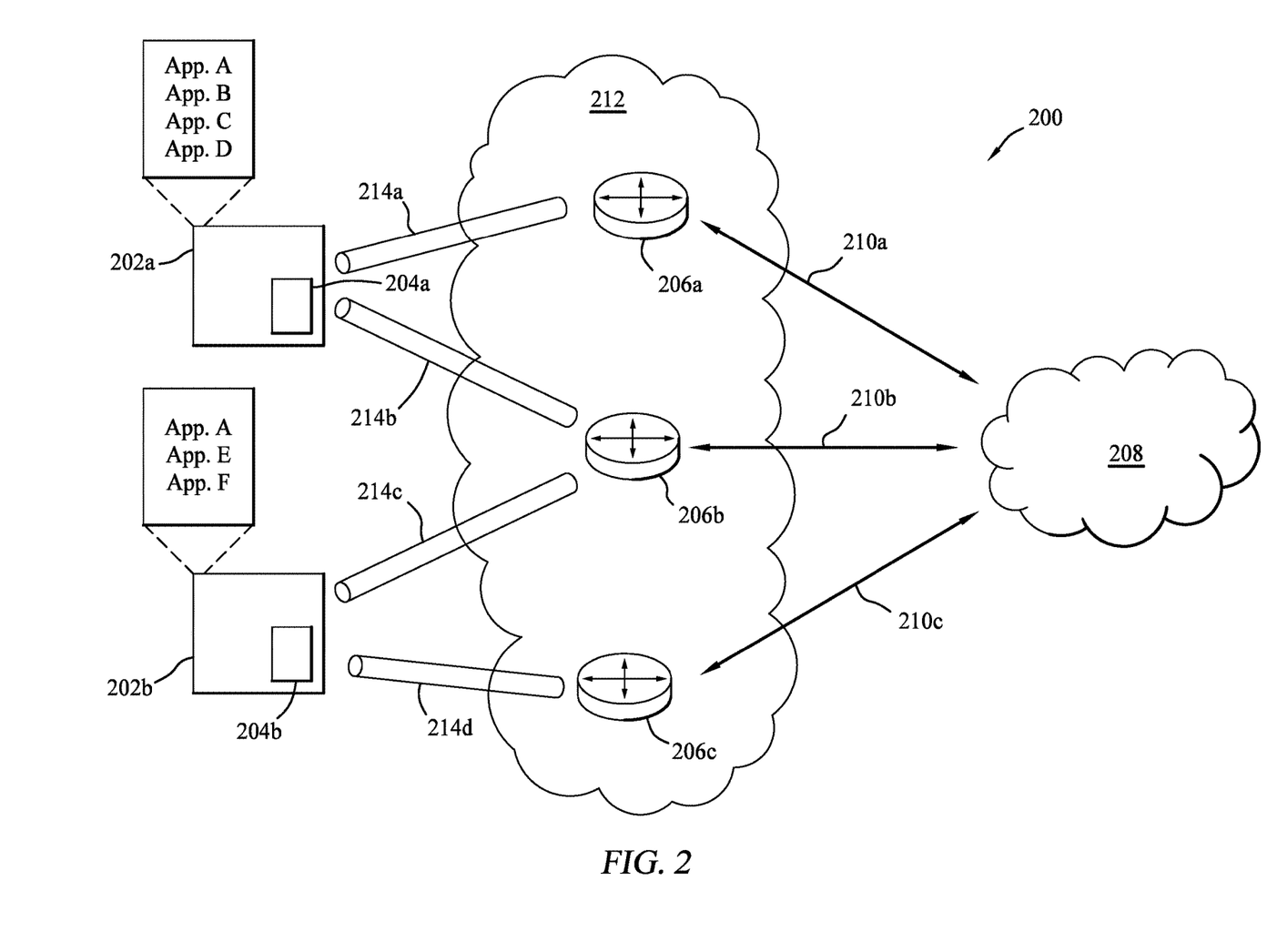
FIG. 2 illustrates an example computer network that provides improved application path selection for cloud-based applications from a client device, according to some embodiments of the present disclosure.
Figure 3:
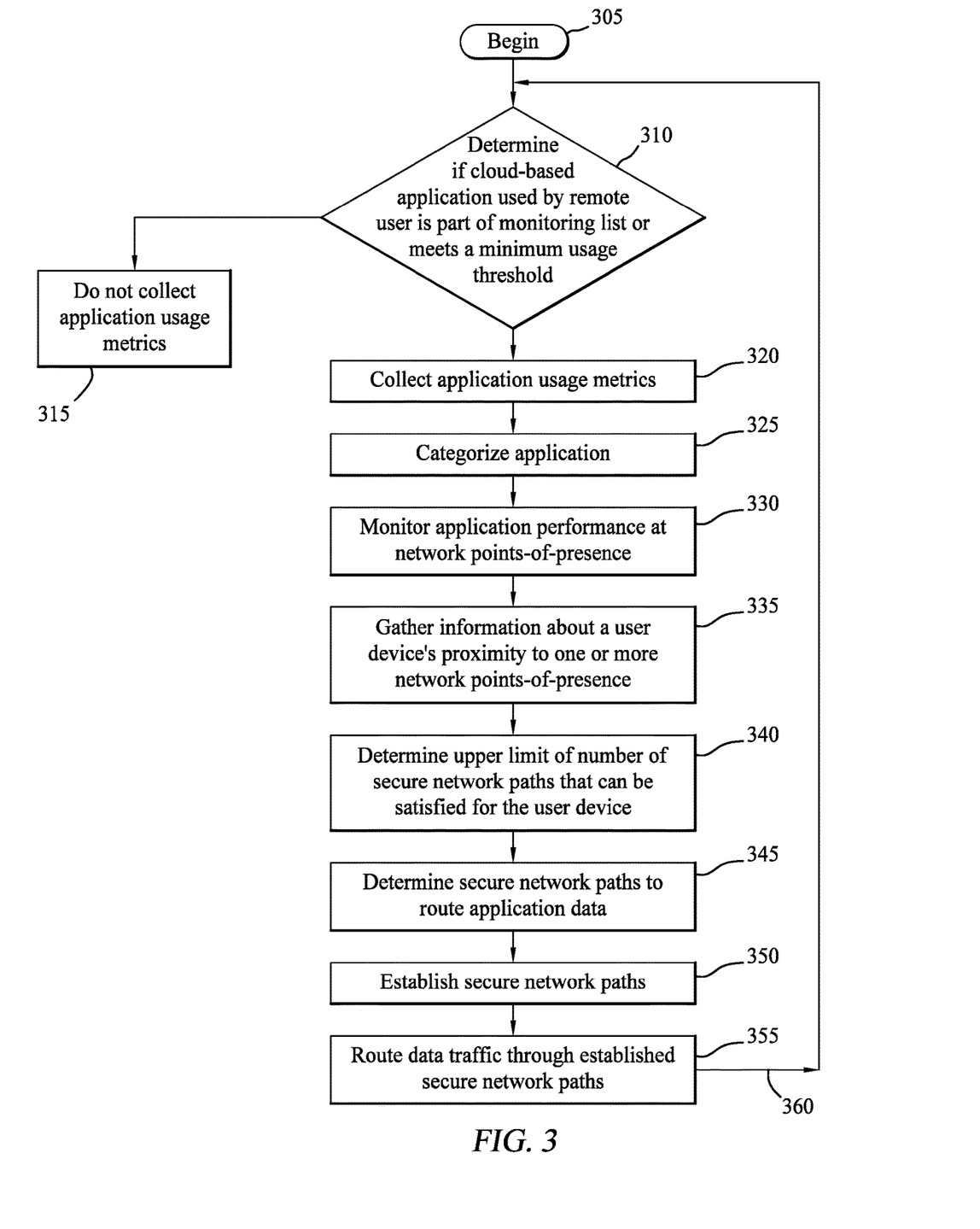
FIG. 3 illustrates and example method for improved application path selection for cloud-based applications from a client device, according to some embodiments of the present disclosure.
Figure 4:
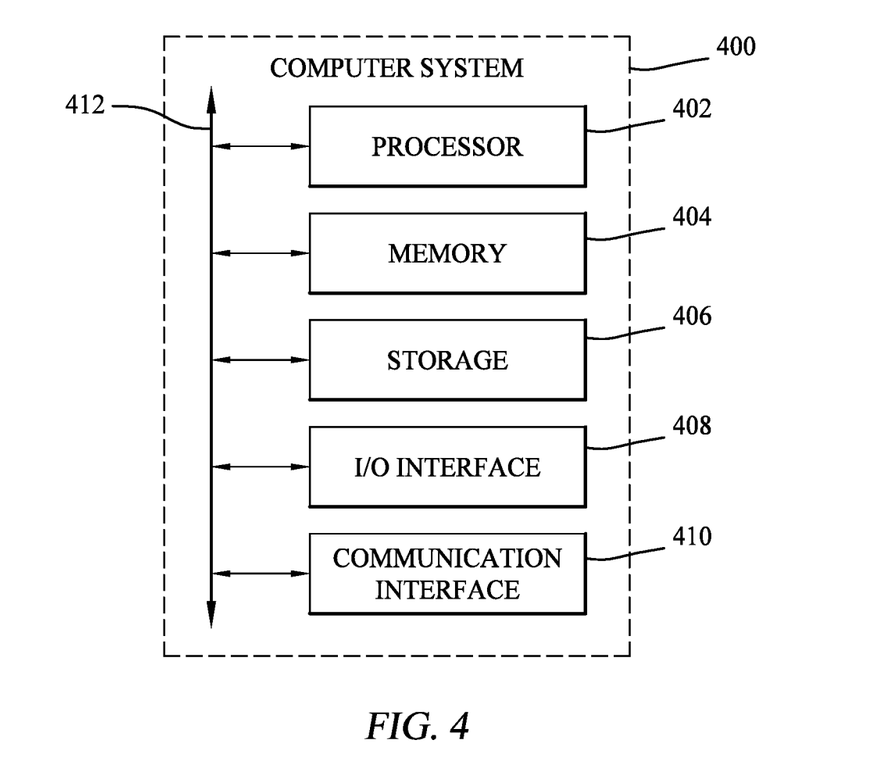
FIG. 4 illustrates an example of a computer system, according to some embodiments of the present disclosure.

This disclosure describes systems and methods for improved application path selection for cloud-based applications from a client device. FIG. 1 illustrates an example network that provides improved application path selection for cloud-based applications from a client device, in accordance with certain embodiments. FIG. 2 illustrates an example network that provides improved application path selection for cloud-based applications from a client device, in accordance with certain embodiments. FIG. 3 illustrates an example method for improved application path selection for cloud-based applications from a client device, in accordance with certain embodiments. FIG. 4 illustrates an example of a computer system, in accordance with certain embodiments.

A user may use one or more cloud-based applications hosted in a cloud server on the user's personal device, such as a laptop or a cell phone. In order to securely access the cloud-based applications, a secure network path (e.g., a Virtual Private Network (VPN)) may be established between the user's device and a particular network point-of-presence (POP), which may then route data traffic from the user device to the cloud server that hosts the cloud-based application. In some cases, the user's device may use the same secure network path to transmit and receive data traffic for all of the cloud-based applications that are used on the user device. However, POPs may be located in different physical locations, and a cloud-based application may perform better when its data traffic is routed through one particular POP. In existing methods and systems for establishing and using secure network paths between a user device and a POP, remote access users are not able to select the POP through which a particular cloud-based application's data is routed to get to and from the user's device and the cloud server. This may reduce cloud-based application's performance if the application's data traffic is routed through a POP that does not offer a desired performance for the cloud-based application. Certain embodiments as described herein improve on these conventional approaches by determining one or more secure network paths between the remote user's device and one or more particular POPs, such that data traffic associated with a particular cloud-based application is routed through the particular one or more POPs along the determined one or more secure network paths.

FIG. 1 is an illustration of an example network 100 that provides improved application path selection for cloud-based applications from a client device, according to particular embodiments. The components of network 100 may include any suitable combination of hardware, firmware, and software. For example, the components of network 100 may use one or more elements of the computer system of FIG. 4. In the illustrated embodiment, network 100 includes user device 102, mobility client 104, network points-of-presence (POPs) 106a-c, cloud server 108, communication links 110a-f, and analysis engine 112. In certain embodiments, data traffic flows from user device 102 to a first POP 106 through a first communication link 110, and from the POP 106 to a cloud server 108 through a second communication link 110. After data traffic is received at cloud server 108, data traffic may flow back to user device 102 through the same components of network 100, e.g., from cloud server 108 to the first POP 106 through the second communication link 110, to user device 102 through the first communication link 110.

User device 102 represents any suitable device that is capable of connecting to network 100. User device 102 may include end-user devices such as laptops, phones, tablets, and any other suitable device capable of connecting to a network. User device 102 may comprise one or more network interfaces, at least one processor, and a memory that is interconnected by a system bus as well as a power supply. In some embodiments, user device 102 represents devices that are capable of running an application (e.g., a cloud-based application) or groups of applications on network 100 and include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. User device 102 may also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

User device 102 may be used by a user to access and use one or more cloud-based applications. The user of user device 102 may be a remote access user that accesses network 100 via a non-enterprise network, a local network, or a remote network (e.g., a home internet connection). User device 102 may include mobility client 104, which represents any suitable device that facilitates the establishment of secure network paths between device 102 and one or more cloud servers 108. A cloud server 108 may host one or more cloud-based applications, which allow a remote user to use an application on user device 102 without having to download or save the application to device 102.

Mobility client 104 represents any suitable system that is capable of facilitating the establishment of a secure network path between user device 102 and cloud server 108 via network 100. Mobility client 104 further represents any suitable system that is capable of monitoring cloud-based application usage metrics on user device 102 and analyzing the usage metrics. Mobility client 104 further represents any suitable system that is capable of communicating with a security platform that monitors data flowing through a network 100. In some examples, mobility client 104 may include the Cisco® AnyConnect Secure Mobility Client.

Cloud server 108 represents any suitable device that is capable of providing the processing, memory, local storage, and network connectivity that drive cloud-based applications. Cloud server 108 may be a virtualized server.

Mobility client 104 may monitor a remote user's use of one or more cloud-based applications on user device 102. In some examples, mobility client 104 may collect usage metrics associated with the remote user's use of the one or more cloud-based applications that are monitored by mobility client 104. For example, mobility client 104 may collect usage metrics associated with one or more of how frequently the user is using a cloud-based application, how long the user uses the cloud-based application when it is used, and how much data the cloud-based application uses when it is used. In some examples, mobility client 104 may collect usage metrics associated with a cloud-based application's performance, such as the cloud-based application's response time, page load, and content time.

Mobility client 104 may use the collected usage metrics to generate profiles about user device 102, the user of the user device 102, the one or more cloud-based applications being monitored by mobility client 104, the one or more network locations in which the one or more cloud-based applications' traffic was generated, and the destination (e.g., the Fully Qualified Domain Name) to which the one or more cloud-based applications' traffic was intended. In some cases, mobility client 104 may collect or derive the usage metrics using one or more application monitoring tools, such as the Cisco® Network Visibility Module, the Cisco® Network Visibility Flow Protocol (i.e., nvzFlow), or the Cisco® ThousandEyes End User Monitoring Support. In some cases, mobility client 104 may evaluate a cloud-based application's performance by, for example, using an application monitoring tool.

In some examples, mobility client 104 may determine to collect the usage metrics associated with the use of the one or more cloud-based applications for a limited set of cloud-based applications. For example, mobility client 104 may determine to collect the usage metrics of only the cloud-based applications that have been selected for collection by a system administrator or user. In another example, mobility client 104 may determine to collect the usage metrics of only the cloud-based applications whose use comprises at least a threshold percentage (e.g., 5%) of user device 102's computing resources dedicated to cloud-based applications. This means that the mobility client 104 may determine not to collect usage metrics for every cloud-based application used on user device 102, but instead collects usage metrics for only the cloud-based applications deemed most important or those that use a threshold level of computing resources. In some examples, mobility client 104 may determine to collect usage metrics according to artificial intelligence (AI) analysis of the could-based applications used on user device 102.

Mobility client 104 may categorize the one or more cloud-based applications used on user device 102 based at least in part on the usage metrics that mobility client 104 collects. In some examples, mobility client 104 may translate the collected usage metrics into high/low/moderate behavior classifications based on the statistical distribution of the collected metrics. In some examples, mobility client 104 may categorize the cloud-based applications into classes based on the behavior indicated by the collected metrics. For example, cloud-based applications with a high duration of use, moderate frequency of use, and moderate data exchange may be categorized into a first class; cloud-based applications with a low duration of use, moderate frequency of use, and moderate data exchange may be categorized into a second class; cloud-based applications with a low duration of use, low frequency of use, and large data exchange may be categorized into a third class; and cloud-based applications with moderate duration of, moderate frequency of use, and large data exchange may be categorized into a fourth class. In some embodiments, the criteria for assigning a given cloud-based application to a given category may change, for example, over time or in response to monitored usage patterns and/or usage metrics or as a result of machine-learning analysis of the cloud-based application usage on user device 102.

Mobility client 104 may periodically collect usage metrics and categorize the cloud-based applications used at user device 102. Mobility client 104 may determine to re-collect usage metrics and re-categorize the cloud-based applications based on a number of factors. For example, mobility client may re-collect usage metrics and re-categorize the cloud-based applications after a given time period has elapsed (e.g., one second, ten seconds, or one minute) since the last collection and categorization has occurred, or after mobility client 104 has determined that a new cloud-based application needs to be monitored and have its usage metrics collected. Accordingly, mobility client 104 may maintain up-to-date information about the usage metrics and categories of the one or more cloud-based applications used at user device 102.

Mobility client 104 may transmit collected usage metrics and/or the categories of the cloud-based applications to analysis engine 112. Analysis engine 112 represents any suitable network device that monitors and manages data traffic flowing through a network 100. In some embodiments, analysis engine 112 may establish secure connections to each device in network 100 and distribute route and policy information via a control plane protocol. The control plane protocol may include Overlay Management Protocol (OMP), Open Shortest Path First (OSPF), Intermediate System to Intermediate System (IS-IS), Border Gateway Protocol, Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc. Analysis engine 112 may also orchestrate secure connectivity between and among the device(s) in network 100. For example, in some embodiments, analysis engine 112 may distribute crypto key information among the device(s). This allows the system to support a secure network protocol or application (e.g., Internet Protocol (IP) Security (IPSec), Transport Layer Security (TLS), Secure Shell (SSH), etc.) without Internet Key Exchange (IKE) and enable scalability of the system. In some cases, analysis engine 112 may monitor data traffic flow in some or all of the POPs 106 in network 100. In some examples, analysis engine 112 may facilitate the establishment of VPNs between user device 102 and cloud server 108. Analysis engine 112 may include one or more physical or virtual network controller appliances. Analysis engine 112 may include devices such as a physical or virtual Cisco® SD-WAN vSmart controller. In some examples, analysis engine 112 represents the Cisco® Umbrella platform.

Analysis engine 112 may monitor and analyze data traffic flowing through network 100 and determine whether that data traffic is to be successfully routed between user device 102 and cloud server 108. If analysis engine 112 determines to successfully route data traffic between user device 102 and cloud server 108, analysis engine 112 may determine a secure network path (e.g., a VPN) through which data traffic between user device 102 and a particular POP 106 flows. Such a secure network path may result in data traffic flowing through a particular POP 106 and one or more communication links 110. Analysis engine 112 may further monitor data traffic metrics at a particular POP 106 and determine the performance of an associated cloud-based application based on the monitored data traffic metrics.

In some examples, analysis engine 112 may determine a secure network path through which data traffic for one or more cloud-based applications is routed between user device 102 and a POP 106 (e.g., POP 106a). In some embodiments, analysis engine 112 may determine a secure network path based at least in part on the collected usage metrics and/or the categories of the cloud-based applications that analysis engine 112 receives from mobility client 104. For example, analysis engine 112 may receive information from mobility client 104 that indicates that a user is using a first cloud-based application and a second cloud-based application, both of which belong to a first class (e.g., a group of applications that are used with a high duration of use, a moderate frequency of use, and a moderate data exchange), and a third cloud-based application that belongs to a second class (e.g., a group of applications that are used with a low duration of use, a moderate frequency of use, and a moderate data exchange). Based at least in part on these categories and/or the usage characteristics associated with these categories, analysis engine 112 may determine that data traffic for the first cloud-based application is to be routed through a first secure network path, data traffic for the second cloud-based application is to be routed through a second secure network path, and data traffic for the third cloud-based application is to be routed through the first secure network path. In some embodiments, cloud-based applications belonging to a particular category may be prioritized over other cloud-based applications that belong to other categories such that analysis engine 112 attempts to assign each of the prioritized cloud-based applications to its own secure network path. Accordingly, analysis engine 112 may steer data traffic for particularly important cloud-based applications (e.g., as indicated by the usage patterns and/or usage metrics associated with the cloud-based applications) to one or more secure network paths that offer improved performance for the prioritized cloud-based applications.

In some embodiments, analysis engine 112 may determine a secure network path based at least in part on the maximum number of secure network paths that a user may use on user device 102. In some cases, the maximum number (e.g., an upper limit) of secure network paths that a user may use on user device 102 is based at least in part on one or more of a system administrator's configuration, the device characteristics of user device 102, the typical job function of the user, and the location of the user's work.

In some embodiments, analysis engine 112 may determine a secure network path based at least in part on the proximity of user device 102 to POPs 106. In some cases, analysis engine 112 receives this proximity information from mobility client 104. For example, mobility client 104 may determine that user device 102 has a first proximity to POP 106a, a second proximity to POP 106b, and a third proximity to POP 106c. Mobility client 104 may then transmit this proximity information to analysis engine 112. Based on this proximity information, analysis engine 112 may determine that POP 106a is the closest POP 106 to user device 102, so analysis engine 112 may prioritize secure network paths that route data traffic to POP 106a when determining a secure network path. Mobility client 104 may determine user device 102's proximity to a POP 106 via a ping test or a bidirectional forwarding detection (BFD) probe. In some cases, analysis engine 112 may determine not to use, or assign a lower priority to, secure network paths that route data traffic to a POP 106 that is outside of a certain threshold proximity to user device 102.

In some embodiments, analysis engine 112 may determine a secure network path based at least in part on a performance score that analysis engine 112 determines for each POP 106 and each cloud-based application used on user device 102. For example, analysis engine 112 may determine that a user uses a cloud-based application on user device 102. Analysis engine 112 may then monitor the data traffic associated with the cloud-based application at each POP 106 to evaluate the cloud-based application's performance at each POP 106. In particular, analysis engine 112 may monitor and analyze performance information associated with one or more of packet loss, latency, capacity, and jitter when evaluating the cloud-based application's performance at a particular POP 106. Based on the monitored performance data, analysis engine 112 may determine a performance score for the cloud-based application per POP 106. For example, analysis engine 112 may determine that the data traffic associated with the cloud-based application experiences a high level of packet loss and high latency when it is routed through POP 106a, low packet loss and low latency when it is routed through POP 106b, and moderate packet loss and moderate latency when it is routed through POP 106c. Accordingly, analysis engine 112 may assign a first performance score (e.g., 25 out of 100) for the cloud-based application at POP 106a, a second performance score (e.g., 75 out of 100) for the cloud-based application at POP 106b, and a third performance score (e.g., 50 out of 100) for the cloud-based application at POP 106c. Based at least in part on these performance scores, analysis engine may prioritize secure network paths that route data traffic to a particular POP 106 when determining secure network paths to transmit data traffic associated with the cloud-based application, for example to the POP 106 with the highest performance score for the cloud-based application (e.g., POP 106b).

When determining the performance scores, analysis engine 112 may evaluate data traffic that is associated with the cloud-based application and generated by different user devices. For example, when a new user first interacts with network 100, it has not yet established a history of data traffic patterns nor generated any usage metrics or application performance metrics specific to the user, its associated user device 102, and the associated cloud-based applications used on its associated user device 102. Accordingly, when analysis engine 112 determines a performance score for a cloud-based application that the new user uses, analysis engine 112 may evaluate the usage metrics and/or application performance metrics associated with the cloud-based application that were generated by other users and their associated user devices 102. In some cases, analysis engine 112 may prioritize or assign greater weight to usage metrics and/or application performance metrics associated with other users and their associated user devices 102 that are located in the same or similar region as the new user and its associated user device 102. In some cases, analysis engine 112 may evaluate data traffic that is associated with the cloud-based application and was generated by user device 102 in the past when analysis engine 112 determines performance scores.

Once analysis engine 112 determines a secure network path through which a cloud-based application's data traffic will be transmitted, analysis engine 112 may transmit secure network path information associated with the determined secure network path to mobility client 104. Secure network path information may comprise information indicating the secure network path that is to be established, and information indicating the one or more cloud-based applications whose data traffic will be transmitted through the secure network path. For example, analysis engine 112 may transmit to mobility client 104 secure network path information that indicates that mobility client 104 is to establish a first secure network path to POP 106a and a second secure network path to POP 106c, and that mobility client 104 is to route data traffic associated with a first cloud-based application through the first secure network path and route data traffic associated with a second cloud-based application through the second secure network path. For example, analysis engine 112 may transmit a first header indicating that data traffic associated with the first cloud-based application is to be routed to POP 106a, which may then forward the data traffic to the first cloud-based application; analysis engine 112 may also transmit a second header indicating that data traffic associated with the second cloud-based application is to be routed to POP 106c, which may then forward the data traffic to the second cloud-based application. In some examples, analysis engine 112 may transmit the secure network path information in a session resumption token (e.g., a Session Token Re-use Anchor Protocol (STRAP) token). In some examples, analysis engine 112 or a POP 106 with which mobility client 104 has already established a secure network path may transmit a session resumption token to a second POP 106, which may facilitate the establishment of a second secure network path through the second POP 106. In some cases, the secure network path information may comprise an IP address that directs mobility client 104 to a particular POP 106 to which mobility client 104 may transmit data traffic associated with a particular cloud-based application.

In some examples, analysis engine 112 may update the secure network paths it determines for data traffic transmission. Such an update may be periodic (e.g., such that it occurs once every ten seconds or one minute) or it may be in response to some condition (e.g., the degradation of a cloud-based application's performance when its data traffic is transmitted through a particular secure network path, or a lull in data traffic giving the relevant network components enough time to establish updated secure network paths). In some cases, analysis engine 112 may continuously monitor and evaluate application performance at POPs 106 so that a change in application performance at a particular POP 106 may trigger analysis engine 112 to update its determination of one or more secure network paths through which cloud-based application data traffic is transmitted. When such an update occurs, analysis engine 112 may determine one or more secure network paths through which data traffic for a cloud-based application is to be routed based on one or more of the cloud-based application categories that analysis engine 112 receives from mobility client 104 (which, as discussed above, may be updated periodically by mobility client 104), proximity information that analysis engine 112 receives from mobility client 104, the number of secure network paths that may be used by user device 102, and the one or more performance scores determined by analysis engine 112 (which, as discussed above, may be updated periodically by analysis engine 112).

Analysis engine 112's update of the secure network paths it determines for data traffic transmission allows analysis engine 112 to dynamically (i.e., in real-time) determine and assign secure network paths to offer improved cloud-based application performance at user device 102. For example, analysis engine 112 may maintain a list of one or more cloud-based applications that use a stateless protocol (e.g., the user datagram protocol (UDP)) to transmit data traffic. When analysis engine 112 determines a secure network path for transmitting data traffic associated with a cloud-based application on this list, analysis engine 112 may transmit the associated secure network path information to mobility client 104, wherein the associated secure network path information indicates both the IP address of the cloud-based application's data server (e.g., cloud server 108) as well as information identifying a first POP 106 through which data traffic associated with the cloud-based application is to be transmitted. Analysis engine 112 may also share the IP address of the cloud-based application's data server with other POPs 106. If analysis engine 112 determines that data traffic for the cloud-based application is to be transmitted through one of these other POPs 106 (e.g., due to the degradation of the cloud-based application's performance when its data traffic is transmitted through the first POP 106), analysis engine 112 may transmit the updated secure network path information to mobility client 104, which may then be able to automatically forward data traffic through the other POP 106 since that POP 106 already has the relevant IP address information for the cloud-based application.

A POP 106 represents any suitable network device that facilitates communication between endpoints in a first network (e.g., a user device 102) and endpoints in second network (e.g., a cloud server 108). POPs 106 may be interconnected to endpoints in each network by the public Internet, a multiprotocol label switching (MPLS) VPN, Software-Defined Wide Area Network (SD-WAN), or the like. In some embodiments, POPs 106 represent any suitable network device that facilitates communication between endpoints in a first region of a network and a second region of a network. In some embodiments, POPs 106 represent any suitable network device that facilitates communication between endpoints in a first network and a core network. In those embodiments, a core network may include an overlay management protocol (OMP) core network.

In some examples, POPs 106 may be located in different locations of a physical region, for example a city, a state, or a country. For example, POPs 106 may be located in different cities of the United States such that POP 106a may be located in Denver, POP 106b may be located in San Francisco, and POP 106c may be located in Boston.

Communication links 110 represent any suitable hardware and/or software that facilitates communication between components in network 100. Communication links 110 may use various IP-based communication protocols to carry data packets within network 100 including general packet radio service (GPRS) tunneling protocol (GTP), next generation application protocol (NGAP), UDP, real-time transport protocol (RTP), and transmission control protocol (TCP). Communication links 110 may include leased lines, Multiprotocol Label Switching (MPLS), IP Security (IPsec), VPN tunnels, fiber, T1 connections (e.g., bonded T1 connections), Digital Subscriber Line (DSL) (e.g., asymmetrical DSL, symmetrical DSL, high data rate Digital Subscriber Line (DSL), very high data rate DSL, etc.), cable modems, dedicated internet access (DIA) circuits, ethernet circuits, Local Area Network (LAN) circuits, and the like. Communication links 110 may include point-to-point circuits, point-to-multipoint circuits, and/or multipoint-to-multipoint circuits. User device 102, POPs 106, and cloud server 108 may communicate via communication links 110. For example, device 102 may communicate with POP 106a via communication link 110a, device 102 may communicate with POP 106b via communication link 110b, and device 102 may communicate with POP 106c via communication link 110c; POP106a may communicate with cloud server 108 via communication link 110d, POP106b may communicate with cloud server 108 via communication link 110e, and POP106c may communicate with cloud server 108 via communication link 110f.

This same system may occur with any number of user devices 102, mobility clients 104, POPs 106, cloud servers 108, communication links 110, and analysis engines 112. The network 100 is not limited to the number of exemplary components depicted in FIG. 1.

In an exemplary embodiment of operation, a user may use one or more cloud-based applications, which may be hosted on cloud server 108, on user device 102. Mobility client 104 may monitor the usage of these cloud-based applications on user device 102 and collect, for some or all of the cloud-based applications, usage metrics associated with the use of the cloud-based applications. Based at least in part on the collected usage metrics, mobility client 104 may categorize the one or more cloud-based applications and transmit the categories to analysis engine 112. In some cases, mobility client 104 may also determine user device 102's proximity to one or more POPs 106, and transmit this proximity information to analysis engine 112. Based on one or more of the received categories of cloud-based applications, proximity information, maximum number of secure network paths available to user device 102, and a determined performance score for each cloud-based application per POP 106, analysis engine 112 may determine one or more secure network paths through which data traffic associated with one or more cloud-based applications may be routed between user device 102 and a particular POP 106. The one or more secure network paths may be determined based at least in part on their transfer of data traffic through a specific POP 106 that offers improved performance of one or more cloud-based applications at user device 102. Analysis engine 112 may transmit information about the one or more selected secure network paths to mobility client 104, and mobility client 104 may establish the one or more selected secure network paths.

FIG. 2 illustrates an example network in greater detail, according to one embodiment. The components of network 200 may include any suitable combination of hardware, firmware, and software. For example, the components of network 200 may use one or more elements of the computer system of FIG. 4. In the illustrated embodiment, network 200 includes user devices 202a-b, mobility clients 204a-b, one or more network points-of-presence POPs 206a-c, cloud server 208, secure tunnels 214a-c, communication links 210a-c, and analysis engine 212. User devices 202 may correspond to user device 102 described above with reference to FIG. 1. Mobility clients 204 may correspond to mobility client 104 described above with reference to FIG. 1. POPs 206 may correspond to POPs 106 described above with reference to FIG. 1. Cloud server 208 may correspond to cloud server 108 described above with reference to FIG. 1. Analysis engine 212 may correspond to analysis engine 112 described above with reference to FIG. 1. Communication links 210 may correspond to communication links 110 described above with reference to FIG. 1. Secure tunnels 214 may correspond to particular communication links 110 described above with reference to FIG. 1 that have been selected as part of a secure network path (e.g., a VPN). In some embodiments, POPs 206a-c may be physically located in different locations of a given region. For example, POP 206a may be located in Chicago, Illinois, POP 206b may be located in Denver, Colorado, and POP 206c may be located in Dallas, Texas.

In an exemplary embodiment of operation, a first remote user uses device 202a to access and use one or more cloud-based applications. When user device 202a first uses the cloud-based applications, mobility client 204a may establish a secure network path between user device 202a and cloud server 208 through POP 206a. In doing so, mobility client 204a may establish secure tunnel 214a, which may securely transport data traffic between user device 202a and POP 206a to securely transport data traffic between user device 202a and POP 206a. POP 206a may then exchange data traffic with cloud server 208 via another communication link 210, such as communication link 210a. When user device 202a first exchanges data traffic with cloud server 208, all of the data traffic associated with the cloud-based applications used on user device 202a may be routed between user device 202a and POP 206a through secure tunnel 214a. Mobility client 204a may monitor the first remote user's use of the one or more cloud-based applications and determine, based on one or more factors, to collect usage metrics associated with a subset of the one of more cloud-based applications used on device 202a. For example, mobility client 204b may be configured to collect usage metrics associated with the cloud-based applications whose use comprises at least a threshold percentage (e.g., 5%) of user device 202a's computing resources dedicated to cloud-based applications. For example, mobility client 204a may determine that Application A comprises 10% of the second user's cloud-based application use on user device 202a, Application B comprises 8% of the second user's cloud-based application use on user device 202a, Application C comprises 15% of the second user's cloud-based application use on user device 202a, and Application D comprises 20% of the second user's cloud-based application use on user device 202a while the remaining portion of the second user's cloud-based application use on user device 202a is attributed to other cloud-based applications that do not comprise more than 5% of the of the first user's cloud-based application use on user device 202a. Accordingly, mobility client 204a may determine to collect usage metrics associated with Applications A-D.

In some examples, mobility client 204a may collect and analyze one or more usage metrics associated with the first remote user's use of Applications A-D on device 202a. For example, mobility client 204a may collect information about how often the user uses a cloud-based application, the duration with which the cloud-based application is used, and how much data the cloud-based application uses when it is used. Based on the metrics it collects, mobility client 204a may determine that Application A and Application B are used frequently each day for a moderate amount of time and exchange a moderate amount of data during use, Application C is used once a day every day and exchanges a very high amount of data for just a couple of minutes during use, and Application D is used a few times a week and exchanges a very high amount of data for an hour or so each time it is used. Accordingly, mobility client 204a may categorize Application A and Application B into a first class (e.g., Class A), Application C into a second class (e.g., Class B), and Application D into a third class (e.g., Class C). Mobility client 204a may then transmit the category information, along with information about the corresponding cloud-based applications, to analysis engine 212 via secure tunnel 214a. In some cases, analysis engine 212 may prioritize the assignment of secure network paths to cloud-based applications belonging to a particular category (e.g., Class A).

In some examples, mobility client 204a may also transmit information indicating the maximum number of unique secure network paths that may be used by device 202a. This maximum number may be based at least in part on the system characteristics of user device 202a. User device 202a, for example, may have the processing and/or memory capabilities that allow user device 202a to use up to two unique secure network paths for transmitting and receiving data traffic for cloud-based applications. Accordingly, mobility client 204a may transmit information to analysis engine 212 that indicates that user device 202a may be allocated up to two unique secure network paths.

Mobility client 204a may also perform a proximity test to determine user device 202a's proximity to POPs 206a-c. For example, mobility client 204a may perform a ping test and determine that device 202a is close to each of POPs 206a-c such that they are each viable options through which data traffic associated with Applications A-D may be transmitted between user device 202a and cloud server 208.

Analysis engine 212 may determine a performance score for each of Applications A-D at each of POPs 206a-c based at least in part on analysis engine 212 monitoring and evaluating data traffic flowing through POPs 206a-c. For example, analysis engine 212 may monitor each of POPs 206a-c and evaluate data traffic associated with Application A that flows through these POPs 206. Analysis engine 212 may monitor data traffic flow characteristics such as packet loss, latency, capacity, and jitter as part of its evaluation. In doing so, analysis engine 212 may determine that data traffic associated with Application A experiences significant packet loss and latency at POP 206a and POP 206c, while data traffic associated with Application A experiences low packet loss and low latency at POP 206b. Accordingly, analysis engine 212 may assign a high performance score (e.g., 75 out of 100) for Application A at POP 206b and a low performance score (e.g., 25 out of 100) for Application A at POPs 206a and 206c. Analysis engine 212 may also perform a similar performance evaluation for each of Applications B-D at each of POPs 206a-c. As a result of these performance evaluations, analysis engine 212 may assign a high performance score (e.g., 75 out of 100) for Applications B and C at POP 206a, a low performance score (e.g., 25 out of 100) for Applications B and C at POP 206b, and a moderate performance score (e.g., 50 out of 100) for Applications B and C at POPs 206c, and analysis engine 212 may assign a high performance score (e.g., 75 out of 100) for Application D at POPs 206b-c and a low performance score (e.g., 25 out of 100) for Application D at POP 206a. Analysis engine 212 may periodically update these performance scores based on continual or periodic monitoring of the cloud-based applications' performance metrics at each POP 206.

Based on one or more of the performance scores, categories of cloud-based applications, proximity between user device 202a and POPs 206a-c, and the maximum number of unique secure network paths that may be established by device 202a, analysis engine 212 may determine one or more unique secure network paths through which data traffic associated with Applications A-D may be transmitted. For example, based on information it has received from mobility client 204a and through its own performance evaluations, analysis engine 212 may be configured to determine a maximum of two unique secure network paths for transmitting the data traffic associated with Applications A-D. Analysis engine 212 may also determine, based at least in part on the proximity information received from mobility client 204a, that each of POPs 206a-c are close enough to user device 202a to be viable endpoints of a secure network path (e.g., based on being within a certain threshold distance from user device 202a). Based at least in part on the received categories of cloud-based applications, analysis engine 212 may determine that the Class A cloud-based applications are prioritized over the others, and accordingly determine to assign the two Class A cloud-based applications (i.e., Application A and Application B) to their own secure network paths. Based at least in part on the performance scores, analysis engine 212 determines that data traffic associated with Application A should be routed through a first secure network path to POP 206b and that data traffic associated with Application B should be routed through a second secure network path to POP 206a.

Because user device 202a is configured for a maximum of two unique secure network paths, it has reached the maximum number of unique secure network paths that it may use after the prioritized cloud-based applications have been assigned to their own unique secure network paths. Accordingly, analysis engine 212 may assign the remaining cloud-based applications (e.g., Applications C and D, which belong to Classes B and C, respectively) to one of the already-determined first or second secure network paths. To do so, analysis engine 212 may assign each of the remaining cloud-based applications to the determined secure network path that routes data traffic to the POP 206 with the highest performance score associated with the cloud-based application. For example, analysis engine 212 may determine, in light of Application C's high performance score at POP 206a and moderate performance scores at POPs 206b-c, to assign Application C to the second secure network path (i.e., the path including POP 206a) along with Application B. Analysis engine 212 may also determine, in light of Application D's high performance scores at POPs 206b-c and low performance score at POP 206a, to assign Application D to the first secure network path along (i.e., the path including POP 206b) with Application A.

Once analysis engine 212 determines this secure network path information (i.e., the secure network paths themselves as well as the mapping of the cloud-based applications to the determined secure network paths), analysis engine 212 may transmit this secure network path information to mobility client 204a via secure tunnel 214a. Secure network path information may comprise an IP address that indicates, in the first three octets of the IP address, the address of the cloud-based application whose data traffic is to be routed and, in the last octet, the address of the POP 206 through which the data traffic is to be routed. For example, user device 202a may make a DNS request to transmit data traffic associated with Application A between user device 202a and cloud server 208. After determining that data traffic associated with Application A is to be routed through the first secure network tunnel (i.e., through POP 206b as determined by analysis engine 212), analysis engine 212 may transmit an IP address that indicates both the address of Application A in cloud server 208 and the identity of POP 206b so that mobility client 204a is configured to establish the first secure network path through POP 206b. In such a case, analysis engine 212 may transmit the IP address "1.1.1.1" to mobility client 204a, where the first three octets (i.e., 1.1.1.1) may indicate the address of Application A in cloud server 208, and the last octet (i.e., 1.1.1.1) may indicate the address of POP 206b. Analysis engine 212 may transmit, for example, the IP address 3.3.3.2 in response to a DNS request to transmit data traffic associated with Application B, where the first three octets (i.e., 3.3.3.2) may indicate the address of Application B in cloud server 208, and the last octet (i.e., 3.3.3.2) may indicate the address of POP 206a. Analysis engine 212 may transmit, for example, the IP address 4.4.4.2 in response to a DNS request to transmit data traffic associated with Application C, where the first three octets (i.e., 4.4.4.2) may indicate the address of Application C in cloud server 208, and the last octet (i.e., 4.4.4.2) may indicate the address of POP 206a. Analysis engine 212 may transmit, for example, the IP address 2.2.2.1 in response to a DNS request to transmit data traffic associated with Application D, where the first three octets (i.e., 2.2.2.1) may indicate the address of Application D in cloud server 208, and the last octet (i.e., 2.2.2.1) may indicate the address of POP 206b. Accordingly, mobility client 204a may be configured with enough information to establish the determined secure network paths and route data through the determined secure network paths.

After receiving the secure network path information from analysis engine 212, mobility client 204a may establish the secure network paths indicated by the secure network path information. Because, for example, the second secure network path has already been established (i.e., by mobility client 204a when user device 202a first began exchanging data traffic with cloud server 208), mobility client 204a does not have to establish this secure network path. Instead, mobility client 204a is able to steer data traffic associated with Applications B and C through the already-established secure network path, which routes data between user device 202a and POP 206a.

Because mobility client 204a has not yet established the first secure network path (i.e., the secure network path to POP 206b), it must do so. Analysis engine and/or POP 206a (i.e., the POP 206 through which mobility client 204a first established a secure network path when first exchanging data traffic with cloud server 208) may transmit a session resumption token to POP 206b so that mobility client 204a may establish a secure network path to POP 206b. Once that is completed, mobility client 204a may establish secure tunnel 214b and secure tunnel 214e, through which data traffic associated with Applications A and D may be transmitted.

Mobility client 204a may periodically re-collect usage metrics and re-categorize the cloud-based applications used at user device 202a. Mobility client 204a may determine to re-collect usage metrics and re-categorize the cloud-based applications based on a number of factors. For example, mobility client may re-collect usage metrics and re-categorize the cloud-based applications once every ten seconds, or after mobility client 204a has determined that a new cloud-based application needs to be monitored and have its usage metrics collected. Accordingly, mobility client 204a may maintain up-to-date information about the usage metrics and categories of the one or more cloud-based applications used at user device 202a.

Analysis engine 212 may update the secure network paths it determines for data traffic transmission. For example, analysis engine 212 may update the determined secure network paths upon detecting that Application A's performance degrades below a threshold performance level. In such a case, analysis engine 212 may determine one or more secure network paths through which data traffic for Application A is to be routed based on one or more of the up-to-date (i.e., most recently-received) cloud-based application categories that analysis engine 212 receives from mobility client 204a (which, as discussed above, may be updated periodically by mobility client 204a), proximity information that analysis engine 212 receives from mobility client 204a, the number of secure network paths that may be used by user device 202a, and the one or more performance scores determined by analysis engine 112 (which, as discussed above, may be updated periodically by analysis engine 212).

In another exemplary embodiment of operation, a second remote user uses device 202b to access and use one or more cloud-based applications. Before user device 202b begins using the one or more cloud-based applications, it may first establish a secure network path to, for example, POP 206b. In doing so, mobility client 204b may establish secure tunnel 214b, through which data traffic may be exchanged between user device 202b and POP 206b. POP 206b may then exchange data traffic with cloud server 208 via communication link 210b. When user device 202b first uses one or more cloud-based applications, mobility client 204b may transmit a DNS request to analysis engine 212, which may determine that user device 202b is trying to access a first cloud-based application (e.g., Application A). Based on previous performance evaluations of Application A, analysis engine 212 may determine that the data traffic associated with Application A should be routed between user device 202b and cloud server 208 through POP 206b (i.e., the POP 206 with the highest performance score associated with Application A). Accordingly, analysis engine 212 may transmit secure network path information that indicates to mobility client 204b both the address of Application A in cloud server 208 and the identity of POP 206b. Because mobility client 204b has already established this secure network path, it does not have to repeat the establishment process and may proceed to transmitting data traffic associated with Application A through this secure network path.

To the extent possible, analysis engine 212 may use existing performance metrics associated with one or more cloud-based applications to determine a secure network path through which application data may be transmitted. Analysis engine 212 may also use other information received from mobility client 204b in determining such secure network paths. For example, mobility client 204b may transmit a DNS request to analysis engine 212 indicating that user device 202b is trying to use a second cloud-based application (e.g., Application B). Mobility client may further perform a proximity test to determine user device 202b's proximity to POPs 206a-c. After doing so, mobility client 204b may determine that POP 206a is too far from user device 202b to be an endpoint of a viable secure network path, and mobility client 204b may indicate this information to analysis engine 212. Although POP 206a is associated with the highest performance score for Application B, analysis engine 212 may determine a different secure network path through which user device 202b may exchange data traffic associated with Application B based at least in part on the proximity information received from mobility client 204b. Analysis engine 212 may then determine a third secure network path to POP 206c for transmitting data traffic associated with Application B between user device 202b and cloud 208 based at least in part on POP 206c having a moderate (e.g., 50 out of 100) performance score associated with Application B. Accordingly, analysis engine 212 may transmit secure network path information that indicates to mobility client 204b both the address of Application B in cloud server 208 and the identity of POP 206c. Because mobility client 204c has not yet established the third secure network path (i.e., the secure network path to POP 206c), it must do so. Analysis engine and/or POP 206b (i.e., the POP 206 through which mobility client 204b first established a secure network path when first communicating with cloud server 208) may transmit a session resumption token to POP 206c so that mobility client 204b may establish a secure network path to POP 206c. Once that is completed, mobility client 204b may establish secure tunnel 214c, through which data traffic associated with Application B may be transmitted to POP 206c. POP 206c may then exchange data traffic associated with Application B with cloud 208 via communication link 210c.

Analysis engine 212 may further determine secure network paths through which application data may be transmitted based at least in part on a maximum number of secure network paths that may be used by user device 202b. For example, analysis engine 212 may determine that user device 202b may use a maximum of two unique secure network paths for transmitting data traffic associated with cloud-based applications. Analysis engine 212 may then receive a DNS request from mobility client 204b indicating that user device 202b is trying to use a third cloud-based application (e.g., Application C). Analysis engine 212 may determine that user device 202b has been assigned its maximum number of unique secure network paths, so analysis engine 212 may determine to assign the data traffic associated with Application C to one of the secure network paths already established by mobility client 204b. Based at least in part on the proximity information received from mobility client 204b and the prior performance evaluations for Application C, analysis engine 212 may determine to use the third secure network path (i.e., the secure network path through POP 206c) for transmitting data traffic associated with Application C between user device 202b and cloud 208. Accordingly, analysis engine 212 may transmit secure network path information that indicates to mobility client 204b both the address of Application C in cloud server 208 and the identity of POP 206c. Because mobility client 204b has already established this secure network path, it does not have to repeat the establishment process and may proceed to transmitting data traffic associated with Application C through this secure network path.

FIG. 3 illustrates an example method for improved application path selection for cloud-based applications from a client device, according to some embodiments of the present disclosure. Method 300 begins at step 305. At step 310, mobility client 104 determines if a cloud-based application used by a remote user on user device 102 is either part of a list of cloud-based applications whose usage metrics are to be collected or meets a minimum usage threshold. If the cloud-based application is neither part of such a list nor meets the minimum usage threshold, then at step 315 mobility client 104 will not collect usage metrics associated with the cloud-based application. If the cloud-based application is either part of such a list or meets the minimum usage threshold, then at step 320 mobility client 104 will collect usage metrics associated with the cloud-based application.

At step 325, mobility client 104 categorizes the cloud-based application based at least in part on the collected usage metrics. In some embodiments, mobility client 104 communicates this category to analysis engine 112. In some examples, mobility client 104 may translate the collected usage metrics into high/low/moderate behavior classifications based on the statistical distribution of the collected metrics. In some examples, mobility client 104 may categorize the cloud-based applications into classes based on the behavior indicated by the collected metrics.

At step 330, analysis engine 112 monitors the cloud-based application's performance at one or more network POPs 106. Based at least in part on the cloud-based application's performance information, analysis engine 112 may determine a performance score for the cloud-based application per POP 106. In some examples, analysis engine 112 may monitor and analyze performance information associated with packet loss, latency, capacity, and jitter when evaluating the cloud-based application's performance at a particular POP 106. When determining the performance scores for a cloud-based application, analysis engine 112 may evaluate data traffic that is associated with the cloud-based application and generated by different user devices. In some cases, analysis engine 112 may evaluate data traffic that is associated with the cloud-based application and was generated by user device 102 in the past when analysis engine 112 determines performance scores.

At step 335, analysis engine 112 gathers information associated with user device 102's proximity to the one or more network POPs 106. In some examples, proximity information may be determined via a ping test or a bidirectional forwarding detection (BFD) probe. In some cases, mobility client 104 may determine proximity information and communicate it to analysis engine 112.

At step 340, analysis engine 112 may determine a maximum number of secure network paths that can be established at user device 102. In some cases, the determined maximum number of secure network paths that can be established at user device 102 may be configured by a system administrator, or it may be based at least in part on the system characteristics of user device 102.

At step 345, analysis engine 112 may determine a secure network path through which data traffic associated with the cloud-based application may be transmitted. In some embodiments, a determined secure network path routes data between user device 102 and a particular POP 106. In some examples, analysis engine 112 may determine the secure network path based on one or more of the category information received from mobility client 104, the performance score determined by analysis engine 112, the proximity information, and the maximum number of secure network paths that can be established at user device 102. In some examples, analysis engine 112 may transmit secure network path information to mobility client 104, where the secure network path information may indicate the address of the cloud-based application and the address of the POP 106 to which the secure network path will flow.

At step 350, mobility client 104 may establish the secure network path based at least in part on the secure network path information received from analysis engine 112. At step 355, mobility client 104 may route data traffic associated with the cloud-based application through the established secure network path.

At step 360, mobility client 104 and analysis engine 112 may repeat one or more steps such that the category of the cloud-based application and/or the determined secure network path is continually or periodically updated.

Various embodiments may perform some, all, or none of the steps described above. Furthermore, certain embodiments may perform these steps in a different order or in parallel. While discussed as user device 102, mobility client 104, POP 106, and analysis engine 112 as performing the steps of this method, any suitable component of network 100 may perform one or more steps of the method.

FIG. 4 illustrates an example of a computer system, in accordance with certain embodiments. In particular embodiments, one or more computer systems 400 provide functionality described or illustrated herein. As an example, one or more computer systems 400 may be used to provide at least a portion of a user device 102, mobility client 104, POPs 106, cloud server 108, communication links 110, analysis engine 112, or secure tunnels 214 described with respect to FIGS. 1 and 2. As another example, one or more computer systems 400 may be used to perform one or more steps described with respect to FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
   collecting metrics associated with usage amounts that indicate at least a frequency with which a remote user uses one or more cloud-based applications on a user device;
   categorizing, based at least in part on the collected metrics, the one or more cloud-based applications into one or more classes that indicate at least the frequency with which the remote user uses the one or more cloud-based applications on the user device, wherein applications categorized into a first class are associated with a priority level;
   determining an upper limit of a number of secure network paths that can be established for the user device,
   determining one or more secure network paths based at least in part on the one or more classes of the one or more cloud-based applications and the determined upper limit of the number of secure network paths that can be established for the user device;
   establishing the one or more secure network paths between the remote user and one or more network points-of-presence; and
   routing data traffic for the one or more cloud-based applications through the one or more established secure network paths based at least in part on the on the one or more classes of the cloud-based applications and the determined upper limit of the number of secure network paths that can be established for the user device, wherein data traffic for each application categorized into the first class is routed through a different secure network path.

2. The method of claim 1, further comprising:
   updating the one or more classes of the one or more cloud-based applications on a periodic basis based at least in part on collection of metrics associated with usage amounts that represent the frequency with which the remote user uses the one or more cloud-based applications; and
   wherein determining one or more secure network paths comprises determining one or more secure network paths based at least in part on the updated one or more classes.

3. The method of claim 1, further comprising:
   monitoring performance of the one or more cloud-based applications at one or more network points-of-presence;
   determining, on a per-application-basis, a performance score for the one or more network points-of-presence based on the monitored performance; and
   wherein determining one or more secure network paths is based at least in part on the performance score.

4. The method of claim 1, further comprising:
   gathering proximity information pertaining to a distance between the remote user and one or more network points-of-presence; and
   wherein determining one or more secure network paths is based at least in part on the proximity information.

5. The method of claim 1, further comprising:
   collecting metrics associated with usage amounts that represent a duration for which the remote user uses the one or more cloud-based applications.

6. The method of claim 1, wherein establishing the one or more secure network paths between the remote user and the one or more network points-of-presence further comprises routing application data traffic through a particular network point-of-presence.

7. A system, comprising:
one or more processors; and
one or more computer-readable non-transitory storage media comprising instructions that, when executed by the one or more processors, cause one or more components of the system to perform operations comprising:
  collecting metrics associated with usage amounts that represent at least a frequency with which a remote user uses one or more cloud-based applications on a user device;
  categorizing, based at least in part on the collected metrics, the one or more cloud-based applications into one or more classes that indicate at least the frequency with which the remote user uses the one or more cloud-based applications on the user device, wherein applications categorized into a first class are associated with a priority level;
  determining an upper limit of a number of secure network paths that can be established for the user device,
  determining one or more secure network paths based at least in part on the one or more classes of the one or more cloud-based applications and the determined upper limit of the number of secure network paths that can be established for the user device;
  establishing the one or more secure network paths between the remote user and one or more network points-of-presence; and
  routing data traffic for the one or more cloud-based applications through the one or more established secure network paths based at least in part on the on the one or more classes of the cloud-based applications and the determined upper limit of the number of secure network paths that can be established for the user device, wherein data traffic for each application categorized into the first class is routed through a different secure network path.

8. The system of claim 7, further comprising:
updating the one or more classes of the one or more cloud-based applications on a periodic basis based at least in part on collection of metrics associated with usage amounts that represent the frequency with which the remote user uses the one or more cloud-based applications; and
wherein determining one or more secure network paths comprises determining the one or more secure network paths based at least in part on the updated one or more classes.

9. The system of claim 7, further comprising:
monitoring performance of the one or more cloud-based applications at one or more network points-of-presence;
determining, on a per-application-basis, a performance score for the one or more network points-of-presence based on the monitored performance; and
wherein determining one or more secure network paths is based at least in part on the performance score.

10. The system of claim 7, further comprising:
gathering proximity information pertaining to a distance between the remote user and one or more network points-of-presence; and
wherein determining one or more secure network paths is based at least in part on the proximity information.

11. The system of claim 7, further comprising:
collecting metrics associated with usage amounts that represent a duration for which the remote user uses the one or more cloud-based applications.

12. The system of claim 7, wherein establishing the one or more secure network paths between the remote user and the one or more network points-of-presence further comprises routing application data traffic through a particular network point-of-presence.

13. One or more computer-readable non-transitory storage media embodying instructions that, when executed by a processor, cause performance of operations comprising:
  collecting metrics associated with usage amounts that represent at least a frequency with which a remote user uses one or more cloud-based applications on a user device;
  categorizing, based at least in part on the collected metrics, the one or more cloud-based applications into one or more classes that indicate at least the frequency with which the remote user uses the one or more cloud-based applications on the user device, wherein applications categorized into a first class are associated with a priority level;
  determining an upper limit of a number of secure network paths that can be established for the user device;
  determining one or more secure network paths based at least in part on the one or more classes of the one or more cloud-based applications and the determined upper limit of the number of secure network paths that can be established for the user device;
  establishing the one or more secure network paths between the remote user and one or more network points-of-presence; and
  routing data traffic for the one or more cloud-based applications through the one or more established secure network paths based at least in part on the on the one or more classes of the cloud-based applications and the determined upper limit of the number of secure network paths that can be established for the user device, wherein data traffic for each application categorized into the first class is routed through a different secure network path.

14. The one or more computer-readable non-transitory storage media of claim 13, the operations further comprising:
updating the one or more classes of the one or more cloud-based applications on a periodic basis based at least in part on collection of metrics associated with usage amounts that represent the frequency with which the remote user uses the one or more cloud-based applications; and
wherein determining one or more secure network paths comprises determining the one or more secure network paths based at least in part on the updated one or more classes.

15. The one or more computer-readable non-transitory storage media of claim 13, the operations further comprising:
monitoring performance of the one or more cloud-based applications at one or more network points-of-presence;
determining, on a per-application-basis, a performance score for the one or more network points-of-presence based on the monitored performance; and
wherein determining one or more secure network paths is based at least in part on the performance score.

16. The one or more computer-readable non-transitory storage media of claim 13, the operations further comprising:
   gathering proximity information pertaining to a distance between the remote user and one or more network points-of-presence; and
   wherein determining one or more secure network paths is based at least in part on the proximity information.

17. The one or more computer-readable non-transitory storage media of claim 13, further comprising:
   collecting metrics associated with usage amounts that represent a duration for which the remote user uses the one or more cloud-based applications.

* * * * *